US006230932B1

(12) United States Patent
Lowing et al.

(10) Patent No.: US 6,230,932 B1
(45) Date of Patent: May 15, 2001

(54) DISPENSING MACHINE FOR PRINTED PUBLICATION

(75) Inventors: C. Rankin Lowing; David Brown, both of Mobile, AL (US)

(73) Assignee: DPC, International, Inc., Dublin (IE)

( * ) Notice: Subject to any disclaimer, the term of this patent is extended or adjusted under 35 U.S.C. 154(b) by 0 days.

(21) Appl. No.: 09/100,482

(22) Filed: Jun. 19, 1998

Related U.S. Application Data

(63) Continuation-in-part of application No. 08/831,737, filed on Apr. 1, 1997, which is a continuation-in-part of application No. 08/727,946, filed on Oct. 9, 1996, now Pat. No. 5,791,511, which is a continuation-in-part of application No. 08/623,998, filed on Mar. 29, 1996, now Pat. No. 5,813,568.

(51) Int. Cl.[7] .................... B65G 59/00; B65H 1/08; G07F 11/16

(52) U.S. Cl. .................... 221/280; 221/279; 221/226; 221/191; 221/258; 221/249

(58) Field of Search .................... 221/191, 258, 221/249, 279, 280, 226

(56) References Cited

U.S. PATENT DOCUMENTS

| | | | | |
|---|---|---|---|---|
| 187,252 | | 2/1877 | Brice . | |
| 2,371,316 | | 3/1945 | Rice et al. | 312/97.1 |
| 2,546,352 | | 3/1951 | Weaver | 312/94 |
| 3,747,733 | * | 7/1973 | Knickerbocker | 194/10 |
| 3,908,859 | | 9/1975 | Hohmann | 221/118 |
| 4,061,245 | | 12/1977 | Lotspeich | 221/75 |
| 4,067,477 | * | 1/1978 | Chalabian | 221/1 |
| 4,131,213 | | 12/1978 | Tamura et al. | 221/14 |
| 4,298,140 | | 11/1981 | Owens | 221/232 |
| 4,312,461 | * | 1/1982 | Godley, Sr. | 221/195 |
| 4,331,261 | * | 5/1982 | Brown | 221/232 |
| 4,367,826 | * | 1/1983 | Glaser | 221/213 |
| 4,473,172 | | 9/1984 | Reynolds | 221/213 |
| 4,501,379 | * | 2/1985 | Halone et al. | 221/221 |
| 4,506,800 | * | 3/1985 | Wingate | 221/6 |
| 4,566,581 | * | 1/1986 | Martin | 194/248 |
| 4,700,869 | * | 10/1987 | Bogner | 221/249 |
| 4,770,321 | * | 9/1988 | Anderson | 221/100 |
| 5,165,571 | * | 11/1992 | Schlumpf | 221/213 |
| 5,209,336 | | 5/1993 | Heltzen et al. | 194/248 |
| 5,305,913 | | 4/1994 | Shade | 221/226 |
| 5,400,919 | | 3/1995 | Gomm et al. | 221/195 |
| 5,431,300 | * | 7/1995 | Kahanek et al. | 221/151 |
| 5,439,136 | * | 8/1995 | Chatani et al. | 221/258 |
| 5,482,184 | * | 1/1996 | Chang | 221/259 |
| 5,709,315 | * | 1/1998 | Kahler et al. | 221/155 |
| 5,791,511 | | 8/1998 | Lowing | 221/614 |
| 5,813,568 | | 9/1998 | Lowing | 221/614 |
| 5,921,436 | * | 7/1999 | Lowing | 221/279 |
| 5,996,840 | * | 12/1999 | Serduke | 221/210 |
| 6,135,315 | * | 10/2000 | Gremillion, III et al. | 221/259 |

FOREIGN PATENT DOCUMENTS

| | | | | |
|---|---|---|---|---|
| 1285942 | | 6/1964 | (DE) . | |
| 2117786 | | 4/1971 | (DE) . | |
| 2437648 | | 2/1976 | (DE) . | |
| 0581076 | | 7/1993 | (EP) . | |
| 0685827 | | 6/1995 | (EP) . | |
| 9012377 | | 10/1990 | (WO) . | |
| WO 94/03877 A1 | * | 2/1994 | (WO) | G07F/11/14 |

* cited by examiner

*Primary Examiner*—Christopher P. Ellis
*Assistant Examiner*—Michael E. Butler
(74) *Attorney, Agent, or Firm*—Keaty Professional Law Corporation

(57) ABSTRACT

The invention relates to a dispensing machine for printed publications. The vending machine allows to dispense one copy at a time by providing a metering break above a dispensing channel. The vending machine has a hollow housing, within which a detachable module is slidable mounted. An operational portion of the machine includes a drive screw connected to a motor by a gear assembly. The printed publications are supported in an upright position on a bearing plate and are advanced towards the dispensing channel by a push plate connected to the drive screw.

21 Claims, 4 Drawing Sheets

DISPENSING MACHINE FOR PRINTED PUBLICATION

CROSS REFERENCE TO RELATED APPLICATIONS

This application is a continuation-in-part of my co-pending application Ser. No. 08/831,737, filed on Apr. 1, 1997, which is a continuation-in-part of my application Ser. No. 08/727,946, filed on Oct. 9, 1996, now U.S. Pat. No. 5,791,511 which is a continuation-in-part of my application Ser. No. 08/623,998, filed on Mar. 29, 1996, now U.S. Pat. No. 5,813,568 the full disclosures of which are incorporated by reference herein.

BACKGROUND OF THE INVENTION

The present invention relates to dispensing machines for printed publications, and more particularly to a machine suitable for vending of newspapers, magazines and the like.

Newspaper and magazine vending machines are conventionally placed in high traffic areas to maximize exposure of the publication to the public. The preferred locations are bus stops, lobbies of public buildings, busy street comers and the like. As a general rule, the newspapers and magazines are stacked in a hollow housing provided with a coin box for receipt of payment from the public.

Once the necessary amount has been deposited, the buyer pulls the front door of the vending machine open and withdraws one copy from the stack of newspapers or magazines positioned in the housing. However, such machines allow access to the entire inventory positioned in the vending machine, without any restrictions as to the number of copies a purchaser retrieves. In some cases, theft of newspapers caused substantial losses to the vending machine owner/operator.

To prevent such losses, the industry realized a need for a dispensing machine that would allow to separate one copy of such publication from the supply of publications in the vending machine and dispense only one copy at a time. Some of known solutions is to use a ratchet mechanism that pulls out one copy of vertically positioned papers and carries them to the dispensing channel. Other approaches use a conveyor-type endless belt or belts for carrying one copy to the dispensing channel.

While such designs can work satisfactory in some environments, there is still a need for a simple to operate, inexpensive dispensing mechanism capable of carefully metering the number of copies removed from the inventory, so as to dispense only one copy at a time. My co-pending applications describe some of the approaches to the problem by providing a metering brake that is mounted on a bearing plate, on which the publications are held in an upright position. While the dispensing machines described in my co-pending applications tested satisfactory in the majority of cases, it was discovered that the industry still needs a simplified dispensing machine that would still allow to dispense only one copy of the publication.

Another consideration that was taken into account when designing the new dispensing machine relates to compliance with the provisions of American with Disabilities Act of 1991. According to this statute, a coin slot on vending machines cannot be higher than 54 inches from the ground and cannot be any lower than 13 inches off the ground Some states implemented their own guidelines for the vending machines and require that all vending machines, without exception, be constructed in such a manner. For example, Florida requires that the dispensing chute be 18 inches from the ground. Such requirements create a design challenge for the technologists, especially in cases where multi-bay vending stations are provided to the public.

When vending machines are stacked one atop the other, the tight vertical limitations imposed by the act become of the greatest consideration. Additionally, it was noted that for people in wheelchairs, the preferred elevation of the coin slot is 48 inches off the ground, while the dispensing chute should be about 18 inches off the ground, rather than the distance required under the federal law. In this environment every millimeter of space in the housing becomes important.

The present invention contemplates elimination of drawbacks associated with the prior art and provision of a dispensing machine for printed publications that is compliance with the Americans With Disabilities Act, while still allowing the vending machine operators to position the units in multi-bay arrangements, if desired.

SUMMARY OF THE INVENTION

It is, therefore, an object of the present invention to provide a dispensing machine for printed publications that can dispense one copy of the publication at a time.

It is another object of the present invention to provide a dispensing machine for printed publications that is easy to operate and inexpensive to manufacture.

A further object of the invention is to provide a dispensing machine that can be easily adjusted to comply with the governmental requirements for access to the public in wheelchairs.

These and other objects of the invention are achieved through a provision of a dispensing machine that comprises a hollow housing and a detachable module slidably mounted in the housing. The module can be easily disengaged from the housing and sent for maintenance and repairs, while another similar module is positioned in the same housing.

The support pedestal is adjustable in height since the two parts of the pedestal telescopically move up and down. The operating mechanism is located in the module. The operating mechanism comprises a bearing plate, on which the printed publications, such as newspapers, are supported. A push plate helps to keep the newspapers in an upright position and advance the papers towards a dispensing channel.

A drive screw is operationally connected to a motor and to the push plate. A gear assembly is provided to connect the drive screw to the motor. The drive screw is long enough to extend under substantially entire length of the bearing plate. The bearing drive screw extends at less than 30-degree angle in relation to the bottom of the module, thereby reducing loads on the motor.

The push plate carries one or more connecting members for connecting to the drive screw. The hollow connecting member has a cylindrical inner wall, which is partially threaded. When the push plate is slightly lifted, it can be easily disengaged from the drive screw and reset to the start of the vending position or closer to the front of the machine if thin papers or a small number of papers are to be dispensed.

To prevent premature dispensing of the forwardmost newspaper, the apparatus provides for the use of a flexible flap that extends in front of the unfolded portion of the newspaper, near the dispensing channel and help to keep the newspaper upright on the bearing plate. A sensor in the dispelling channel detects when the newspaper is dispensed.

BRIEF DESCRIPTION OF THE DRAWINGS

Reference will now be made to the drawings, wherein like parts are designated by like numerals, and wherein.

DETAILED DESCRIPTION OF THE PREFERRED EMBODIMENT

Figure 2:
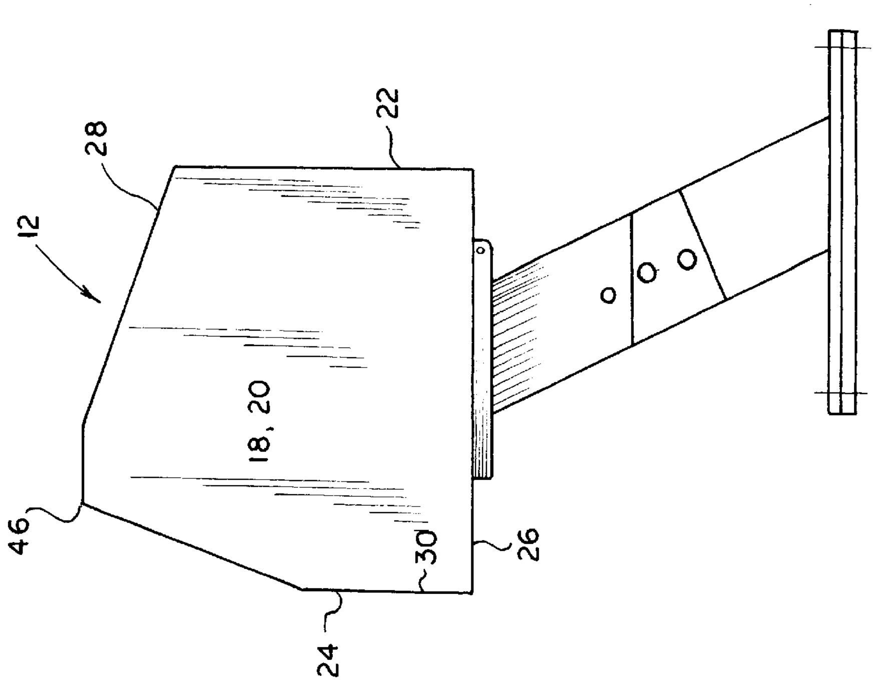
FIG. 2 is a side view of the vending machine.

Turning now to the drawings in more detail, numeral 10 designates the vending machine of the present invention. The vending machine 10 comprises a housing 12 mounted on a pedestal 14 which, in turn, is supported on a base 16. The housing 12 has a pair of side walls 18 and 20, a back wall 22, a front wall 24, a bottom 26 and a top 28. The front wall 24 has a lower part 30 and an upper part 32 which is positioned at an obtuse angle in relation to the lower part 30, as better seen in FIG. 2. The upper part 32 is provided with a transparent window 34 to allow the public to read the front page of the publication located in the cabinet.

Figure 1:
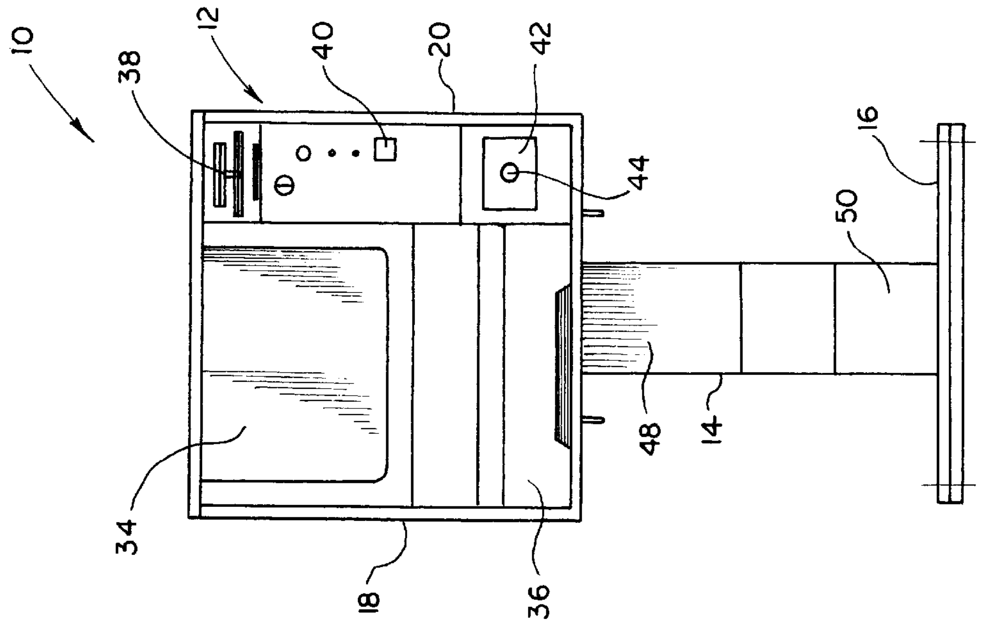
FIG. 1 is a front view of a vending machine in accordance with the present invention.

The lower part 30 is provided with a dispensing chute 36 for receiving of the newspaper or magazine dispensed by the vending machine after the appropriate payment has been made by the customer. The front wall 24 is provided with a coin slot 38 where the customer can deposit the coins. A coin return opening 40 is made below the coin slot 38, as shown in FIG. 1. A case box 42 collects the deposited payment. A keyed access 44 to the case box 42 is provided in a conventional manner. If desired, the top 28 of the housing 12 can be provided with hinges, such as at 46, to allow the vendor to open the cabinet and obtain access to the interior of the housing from the front of the unit.

The pedestal 14 is comprised of two telescoping portions 48 and 50 to allow adjustment of the elevation of the coin box and the dispensing opening to various applications, all in compliance with the government regulations. The telescopic connection between the pedestal can be adjusted in pre-determined increments, allowing to extend or shorten the height of the pedestal, depending on the particular requirements of the location.

Figure 3:
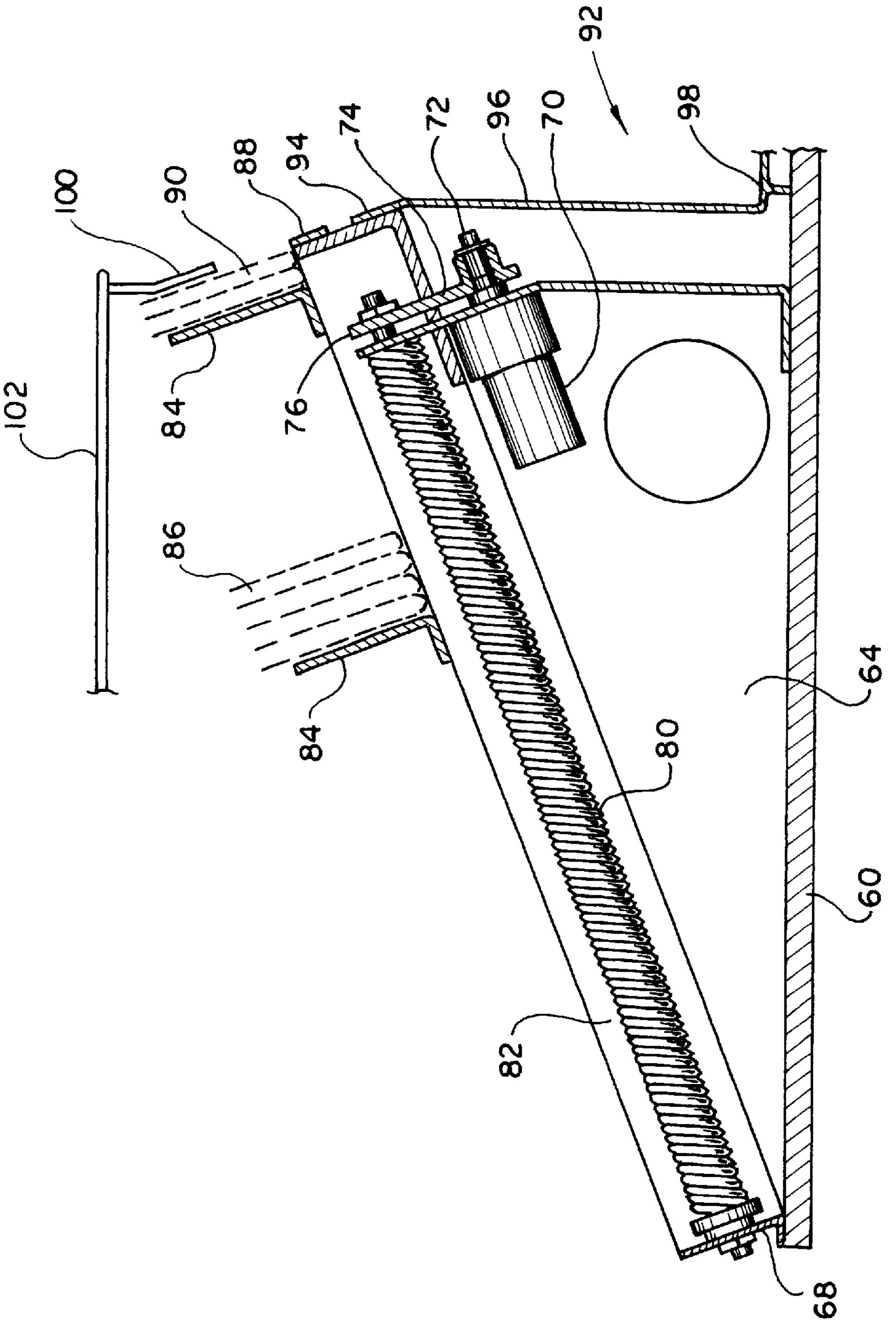
FIG. 3 is a schematic view of the operating mechanism of the dispensing machine in accordance with the present invention.
Figure 4:
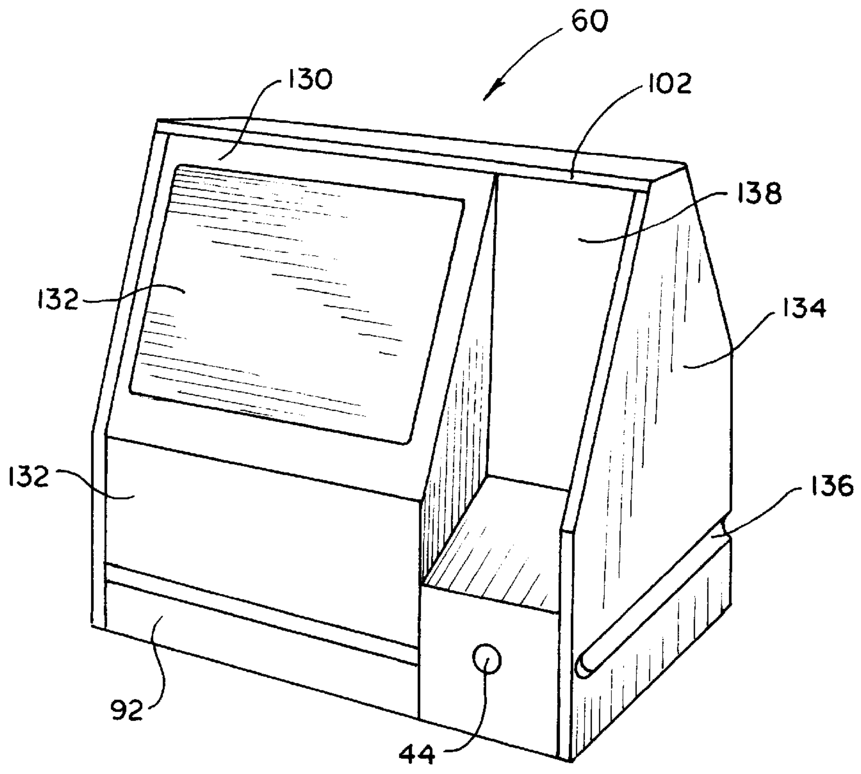
FIG. 4 is a detailed view showing the inner module positioned in the vending machine of the present invention.

Turning now to FIG. 3 of the drawings, the dispensing mechanism of the present invention is shown in more detail. As can be seen in the drawing, the operational portion is positioned on a base plate 60 that extends through substantially entire depth of an inner module 62 (FIG. 4). The base plate 60 supports a pair of ramp plates 64. Secured to the ramp plate 64 is a first, forward motor supporting bracket 66 and a second, rear motor supporting bracket 68.

A motor 70 is supported on the bracket 66 adjacent to the front of the unit 62. The motor 70 has a drive shaft 72 operationally connected to a first gear 74. A second gear 76 is operationally connected to the first gear 74 and to a lead, or drive screw 80. When the motor 70 is activated, rotation is transmitted through the drive shaft 72 to the gears, 74, 76 and to the lead screw 80.

Mounted above the lead screw 80 is a bearing plate 82 which supports a push plate 84 movable along the plate 82 in response to rotation of the lead screw 80. The support plate 84 is oriented at an approximately right angle to the lead screw 80. The support the printed publications in a generally upright position, with folded edges of the publications sliding along the bearing plate 82. The lead screw 80 extends under substantially entire length of the bearing plate 82 in order to maximize the space available within the module 62, while reducing loads on the motor 70.

The push plate 84 moves the publication 86 to the proximal edge 88 of the bearing plate 82, where the forwardmost copy 90 of the publications is dispensed after the payment has been received in the vending machine. The copy 90 drops, by gravity, into a dispensing channel 92 defined by the dispensing chute.

The dispensing chute has an upper plate 94 integrally connected to the middle portion 96. The plate 94 is connected at about 20° angle to the middle portion 96 to facilitate dispensing of the publication and allow to increase the size of the dispensing chute. Such arrangement is particularly useful in dispensing especially voluminous Sunday newspapers that can be 300 to 500 sheets thick.

The bottom part of the dispensing channel is defined by a turned-up portion 98, which prevents the dispensed publication from falling out of the dispensing chute before a customer has a chance to retrieve it.

To prevent premature falling of the forwadmost publication 90, a flexible flap 100 is secured to a top 102 of the module 62. The flap 100 extends downwardly along an unfolded edge of the newspaper. The flexible flap prevents the first copy from leaning forward and causing premature dispensing of the publication 90 into the dispensing channel 92.

Figure 5:
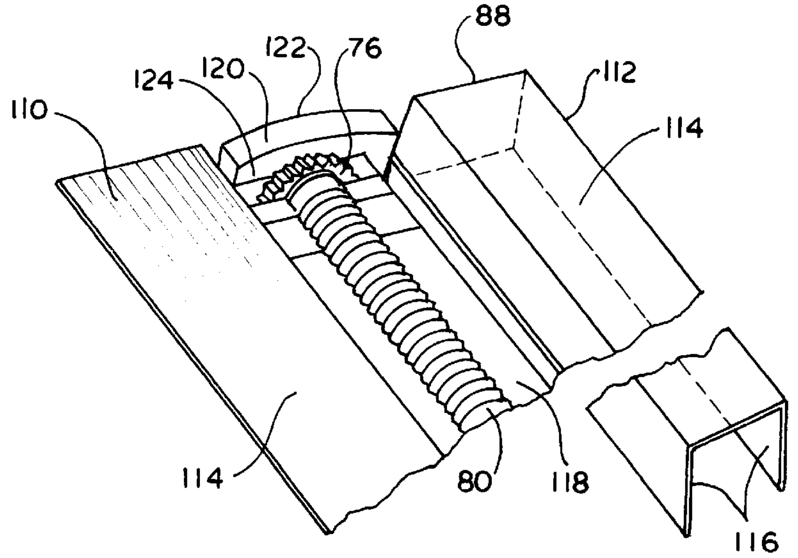
FIG. 5 is a detailed view showing a platform made of two parts and a metering brake at the edge of dispensing channel.

Turning now to FIG. 5, the bearing plate 82 is shown in more detail. The bearing plate 82, in one of the embodiments, is comprised of a pair of inverted U-shaped members 110 and 112. The two-part construction simplifies manufacture and gives access to the lead screw 80 from the top of the operating mechanism. The individual portions 110 and 112 are formed from bent metal sheets, each having a top surface 114 and a pair of downwardly extending flanges 116.

The drive screw 80 is positioned in a space between the parallel bearing plates, in its own channel guide 118, the upwardly turned sides of which are attached to the adjacent side walls 116 of the bearing plate members 110 and 112. Of course, if desired, the bearing plate 82 can be constructed as a solid plate, substantially covering the lead screw 80.

A metering brake, or means 120 for separating a single forwardmost copy of the publication with an upwardly inclined upwardly inclined upper surface extends upwardly from the top surface 114 of the bearing plate members 110, 112. The metering brake member 120 in this embodiment is a solid block with a front edge 122 being higher than the distant edge 124. If desired, the top surface of the metering brake 120 can be roughened to increase friction of the publication when it moves along the metering brake 120 into the dispensing channel. Tests demonstrated that such material as nylon was particularly advantageous when used for the body of the metering brake 120 and the gears 74,76.

Tests also demonstrated that a preferred angle "a" between the drive screw, and therefore, between the bearing plate and the base plate is less than thirty degrees, for example about 20° which allows to position more inventory in the module 62 without increasing its dimensions. Bringing the angle down to 20° brings the newspapers or magazines closer to the dispensing chute 96 to accommodate the requirements of the Americans With Disabilities Act by bringing the dispensing chute closer to the customer. An additional advantage is that less angle of the bearing plate imposes less load on the motor 70, since the push plate 80 does not have to ascend at a greater angle when advancing the publications 86 to the edge of the bearing plate 88.

Turning now to FIG. 4, the inner module of the dispensing machine of the present invention is illustrated. The module 62 follows the general configuration of the housing 12. Similarly, the front wall has a rearwardly inclined plate 130 with a wide opening 132 behind which the publications can be displayed. The lower part 132 is slightly recessed to accommodate the dispensing chute 96.

Mounted on the side walls 134 of the module 62 are a pair of slides, or rails 136 adapted for sliding engagement with slide guides (not shown) attached to the interior walls of the housing 12. When necessary to replace the inner module 62, an operator simply slides the module 62 out and replaces it with another similar module, bringing the first module for maintenance, repair, or other necessary operations.

In order to protect the publications in the module 62 from the environment, a peripheral flange 138 is formed about an exterior open edge of the module 62. If desired, a matching lip can be formed on the housing exterior edge to form a watertight seal against moisture, which can damage the publication and make it less desirable for the consumer.

Figure 6:
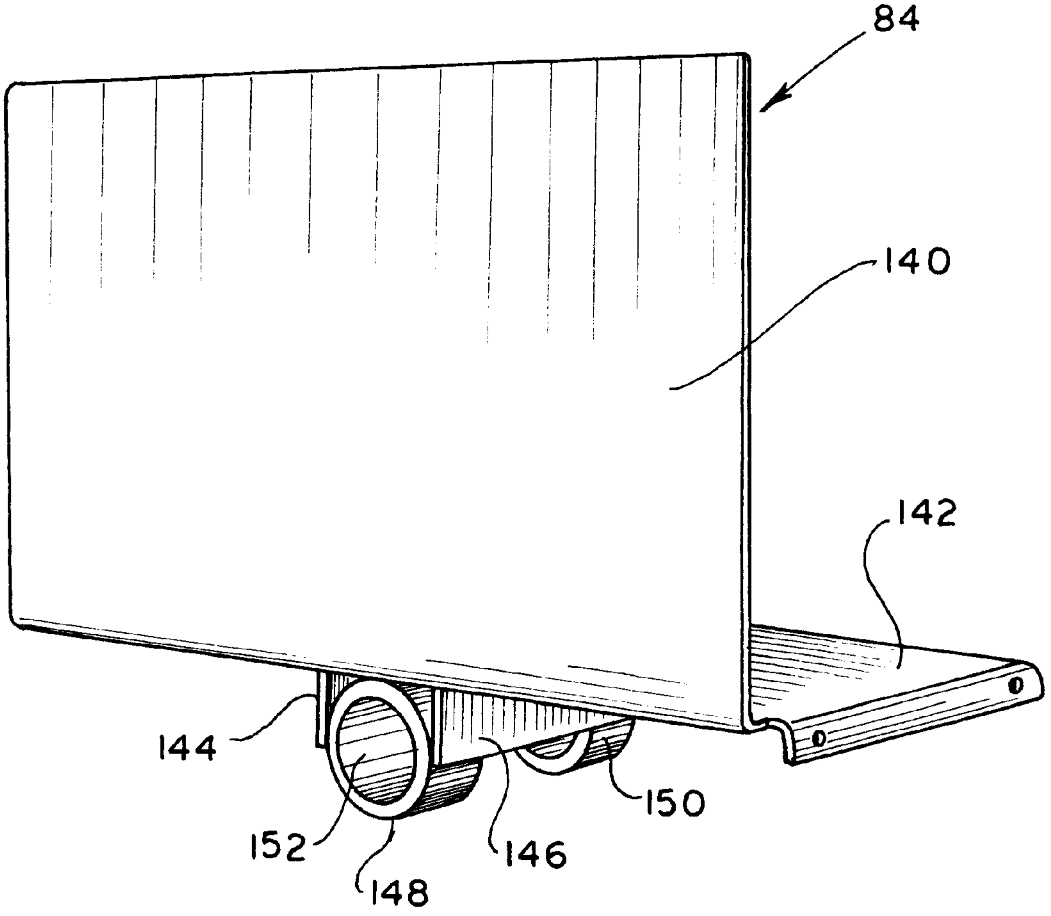
FIG. 6 is a detailed view showing a push plate adapted to advance publications toward a dispensing channel.

Turning now to FIG. 6, the push plate 84 is illustrated in more detail. As can be seen in the drawing, the push plate 84 comprises a vertical member 140 integrally formed with a horizontal portion 142. Securely attached to the bottom of the horizontal member 142 is a pair of attachment plates 144 and 146. A pair of connecting members, for example nuts 148, 150 is fixedly attached between the plates 144 and 146.

The inner cylindrical wall of each nut 148, 150 is normally provided with threads for engagement with the lead screw. The present invention contemplates removal of about one half of the inner threads, such as at 152 from the inner surfaces of the nuts 146, 150. After the entire inventory of the publication has been dispensed, the vendor needs to return the push plate 84 to its starting position at the very rear of the bearing plate 82. When the push plate 84 is slightly lifted, the smooth surface 152 does not resist disengagement of the lead screw from the push plate, allowing the push plate to be reset to the desired position.

Similarly, when an operator desires to position only a limited number of publications, the push plate 84 can be moved half way along the bearing plate 82 and the lead screw 80, thereby supporting the publications 86 at any desired location along the bearing plate 82.

If desired, a stop can be formed on the rail 136 to normally prevent complete disengagement of the inner module from the housing. This safety feature can be used during normal operation and disconnected when the module needs to be replaced or repaired. The keyed change box 42 on the front of the machine can be removed from the module 62 only by an operator who has a key. When the front wall is lowered, it is impossible to retrieve the coin box by unauthorized persons.

To simplify manufacture, the lead screw 80 is carried by the same bracket 66 as the motor 70. The fact that the push plate 84 can be manually repositioned to the start of the vending cycle or anywhere in between, allows to save electricity and avoid drain on the battery. By eliminating the support for the display copy in the machine, the electronics required for dispensing of the very last, display copy, could be eliminated, thus simplifying the construction and operation of the dispensing unit.

If desired, a sensor can be positioned in the dispensing channel 92; it can be an optical sensor or an electric switch that is activated when the copy of the publication is dispensed into the channel 92. The sensor can be positioned at a location within the channel 92 which would prevent access to the sensor and tampering therewith by customers.

If desired, a solar panel can be incorporated into the front door housing 12 to continue to recharge the battery and thereby extend the lifetime of the motor. The push plate 84 is made relatively short, smaller than the height of the publication in order to minimize the loads on the motor in advancing the push plate along the bearing plate 82. If desired, the bearing plate 82 and the dispensing chute 96 can be made as one piece, allowing the newspaper 90 to smoothly fall down the dispensing channel 92.

It is also envisioned that in some multi-bay applications an adaptor piece will be required to make the second row units more stable. The adaptor piece will cause the top row of the dispensing units to be tilted slightly forward, so as to allow viewing of the publication through the window.

Many other changes and modifications can be made in the design of the present invention without departing from the spirit thereof. We, therefore, pray that our rights to the present invention be limited only by the scope of the appended claims.

We claim:

1. A dispensing machine for printed publications, comprising:

a bearing plate for supporting a plurality of printed publications in an upright position;

a push plate slidably movable along said bearing plate for advancing said printed publications to a proximal dispensing edge of the bearing plate;

a stationary means fixedly secured at the dispensing edge of the bearing plate for separating a single forward copy of the publication for dispensing; and a flexible flap retainer mounted above said bearing plate for retaining an unsupported portion of said forward copy to prevent said forward copy from leaning forward and to prevent premature dispensing of said forward copy.

2. The apparatus of claim 1, wherein said bearing plate comprises a pair of spaced-apart members, and wherein a channel is formed between said bearing plate members.

3. The apparatus of claim 2, wherein a drive screw is mounted in said channel, said drive screw being operationally connected to said push plate and to a motor for advancing said push plate along said bearing plate.

4. The apparatus of claim 1, further comprising a motor-driven drive screw and a means for operationally connecting said push plate to said drive screw.

5. The apparatus of claim 4, wherein said means for connecting the push plate comprises at least one connecting member provided with a cylindrical center opening, said opening being defined by a partially threaded inner wall.

6. The apparatus of claim 3, wherein said means for separating a single copy of the printed publication comprises a metering break member mounted in a front portion of said channel, said metering break member having an upwardly inclined upper surface which extends above said bearing plate.

7. The apparatus of claim 4, wherein said drive screw is operationally connected to a motor by a gear assembly.

8. The apparatus of claim 4, further comprising a support base and a means for supporting said drive screw at an angle in relation to said support base.

9. The apparatus of claim 8, wherein said support means supports said drive screw at an angle of less than 30 degrees above said support base.

10. The apparatus of claim 4, wherein said drive screw extends under substantially entire length of said bearing plate.

11. A dispensing machine for printed publications, comprising;

a hollow housing having a rearwardly inclined front wall, said housing being provided with a dispensing channel;

a detachable module slidably mounted inside the housing;

a bearing plate for supporting said printed publications inside said module in an upright position;

a push plate mounted in said module for advancing said printed publications toward said dispensing channel;

a stationary means fixedly secured at the dispensing edge of the bearing plate for separating a single forwardmost copy of said printed publications for dispensing.

12. The apparatus of claim 11, further comprising a motor-driven drive screw mounted below said bearing plate, said drive screw being releasably connected to said push plate.

13. The apparatus of claim 12, wherein said push plate cares at least one connecting member on a bottom portion thereof said connecting member having a partially threaded inner wall, such that lifting of said push plate releases said push plate from engagement with said drive screw and allows movement of said push plate along said drive screw.

14. The apparatus of claim 12, wherein said drive screw is supported at an angle of less than 30 degrees from a bottom of said module.

15. The apparatus of claim 12, wherein said drive shaft extends under substantially entire length of said bearing plate.

16. The apparatus of claim 11, wherein said module has a pair of opposing side walls, each side wall carrying a slide rail adapted for engagement with a corresponding slide guide secured to an inner wall of said housing.

17. The apparatus of claim 11, wherein said bearing plate comprises a pair of parallel bearing plate members defining a bearing surface and a channel between the bearing plate members.

18. The apparatus of claim 17, wherein a motor-driven drive screw is mounted in said channel below said bearing surface.

19. The apparatus of claim 11, wherein said drive screw is operationally connected to a motor by a gear assembly.

20. The apparatus of claim 11, wherein said module is provided with an inwardly extending peripheral lip for preventing moisture penetration into said module.

21. The apparatus of claim 11, wherein said pedestal comprises a pair of telescopically connected parts to facilitate vertical adjustment of said pedestal in relation to a horizontal surface.

* * * * *